United States Patent

Oliver

[15] 3,670,099

[45] June 13, 1972

[54] FACSIMILE SYSTEM UTILIZING PRE-SCAN DETECTION OF INDICIA

[72] Inventor: Donald S. Oliver, Acton, Mass.

[73] Assignee: Itek Corporation, Lexington, Mass.

[22] Filed: March 18, 1968

[21] Appl. No.: 713,689

[52] U.S. Cl. ........................178/6, 178/DIG. 2, 178/DIG. 3, 178/7.6

[51] Int. Cl. ........................H04n 1/12, H04n 7/12

[58] Field of Search ................178/DIG. 3, DIG. 27, DIG. 2, 178/7.1, 7.6

[56] References Cited

UNITED STATES PATENTS

| | | | |
|---|---|---|---|
| 2,957,941 | 10/1960 | Covely | 178/DIG. 3 |
| 3,502,803 | 3/1970 | Bigenwald | 178/6 |
| 3,201,512 | 8/1965 | Mason | 178/DIG. 3 |
| 3,428,744 | 2/1969 | Green | 178/DIG. 3 |
| 3,430,057 | 2/1969 | Genahr | 178/DIG. 3 |
| 3,436,474 | 4/1969 | Saeger | 178/DIG. 3 |
| 3,445,598 | 5/1969 | Green | 178/DIG. 3 |

*Primary Examiner*—Robert L. Griffin
*Assistant Examiner*—Joseph A. Orsino, Jr.
*Attorney*—Homer O. Blair, Robert L. Nathans, Lester S. Grodberg and Blair, Buckles, Cesari & St. Onge

[57] ABSTRACT

A facsimile system connected to a transmission line of limited bandwidth has a novel optical scanner which scans data-bearing segments of a document at normal speed and blank segments at a higher speed to conserve the limited bandwidth of the transmission line. In addition to the usual reading head, the scanner includes a first data-detecting head to scan the document a fixed distance in advance of the reading head and generate signals indicative of the presence or absence of data in scanned segment. These signals are applied to drive mechanism to control the speed of the scanner so that blank segments are "read" more rapidly than data-bearing segments. This results in significant time savings in scanning and allows compression of a greater amount of information into the transmitted signal. A second data-detecting head controls the skipping of blank lines and further improves the performance of the system.

The invention is accordingly drawn to an apparatus for "reading" the contents of a document at different speeds depending on the presence or absence of indicia at various segments of the document and comprises a reading head, driving means for moving the reading head at a controlled speed with respect to the document, an optical indicia-detecting head spaced from the reading head and movable across the document in advance of the reading head to generate control signals indicative of the presence or absence of indicia in advance of the reading head, and means for controlling the speed of the driving means in accordance with the control signals generated by the indicia-detecting head to thereby move the reading head over indicia-bearing segments of the document at one speed and over indicia-free segments of the document at a greater speed to thereby reduce the time required to read and reproduce the contents of the document.

21 Claims, 9 Drawing Figures

INVENTOR.
DONALD S. OLIVER
BY Blair, Buckles, Cesari & St. Onge
ATTORNEYS

INVENTOR.
DONALD S. OLIVER
BY Blair, Buckles, Cesari & St. Onge
ATTORNEYS

INVENTOR
DONALD S. OLIVER
BY Blair, Buckles, Cesari & St. Onge
ATTORNEYS

INVENTOR
DONALD S. OLIVER
BY Blair, Buckles, Cesari & St. Onge
ATTORNEYS

INVENTOR
DONALD S. OLIVER
BY Blair, Buckles, Cesari & St. Onge
ATTORNEYS

FACSIMILE SYSTEM UTILIZING PRE-SCAN DETECTION OF INDICIA

BACKGROUND OF THE INVENTION

1. Field of the Invention

Facsimile systems electrically reproduce at remote locations copies of documents, such as pictures or written or printed pages. A typical system includes an optical scanner comprising a light source for illuminating segments of the document and a reading head for receiving light reflected from the document and for generating information signals in accordance with the data on it. A data transmitter transmits these signals to the remote location, and a receiver there converts the signals into a reconstructed image of the document.

2. Prior Art

It is generally desirable to scan the document to be reproduced at as great a rate as possible. The maximum scanning speed is directly proportional to the desired resolution of the system and to the bandwidth capabilities of the transmitter utilized to transmit the information. In conventional facsimile systems using telephone lines to transmit data, the relatively narrow bandwidth of the line (of the order of 3,000 Hz) severely limits the maximum scanning velocity which may be utilized for a given resolution. Thus, for a system which can resolve lines 0.01 inch wide, the maximum scanning velocity with present telephone facilities is approximately 30 inches per second. In practice, scanning velocities somewhat less than this are utilized and the time required to scan and reproduce a document is therefore relatively long; for example, with present facsimile systems, approximately 6 minutes are required to reproduce the image of a document 8 ½ × 11 inches.

The present invention eliminates these and other disadvantages of prior facsimile systems and provides an improved facsimile system in which the time required to scan and reproduce a document is substantially less than that required by conventional systems. This is accomplished by means of a novel scanner which moves over the document at varying controlled rates dependent on the presence or absence of data in the document at portions being "read".

The optical scanner of my invention is further characterized by having a number of data-detecting heads whose signals are coded to distinguish them from each other. This allows close spacing of the various heads without undesired "cross-talk" and assists in simplifying the signal-processing circuitry for the scanner.

Other advantages of the invention will appear more fully hereinafter.

My invention accordingly comprises the features of construction, combination of elements, and arrangement of parts exemplified in the constructions hereinafter set forth, and the scope of the invention is indicated in the claims.

BRIEF SUMMARY OF THE INVENTION

This invention makes use of the fact that most documents have a significant amount of blank space in which no data is located. In present-day facsimile systems, the optical scanner consists simply of a reading head which moves continuously across the document with a fixed speed and which therefore scans the data-bearing segments and the blank segments at the same rate. In such systems, the data link between the transmitter and receiver is needlessly tied up for significant periods of time during the scanning of blank segments and the limited bandwidth of the system is therefore inefficiently utilized.

In contrast, my facsimile system has a novel scanner which scans the data-bearing portions of a document at one rate and scans the blank spaces at a much higher rate. In addition to the usual reading head, it also has a first data-detecting head positioned to scan a predetermined distance in advance of the reading head. The signals from this head indicate the presence or absence of data in portions of the document in advance of the reading head; they are used to control the speed at which the scanner drive mechanism subsequently moves the reading head over such portions. Hereinafter, the term "scanning segment" will be used to indicate that portion of the document which passes under a head during a scan; the term "data" will be used to indicate an ink-bearing portion within a scanning segment in a normal black-on-white document.

A second data-detecting head scans the next line in advance of the line currently being read. Its output is also applied to the scanner drive mechanism to cause the scanner to skip a blank line following the line currently being read.

The reading head and data-detecting heads preferably comprise optical fiber bundles which transmit light to the document being scanned and which receive light reflected from the document for transmission to signal processing circuitry. In order to insure that an output from one of the heads is not falsely caused by a signal reflected by the document back onto a given head from one of the other heads, separate light sources, each modulated by a different discrete frequency signal, are provided for the respective heads. The reflected signals are subsequently filtered to recover the discrete frequency components which are then processed for transmission to the remote receiver.

Other and further objects and features of my invention will be more readily understood with reference to the following detailed description of the drawings, in which.

Figure 1:
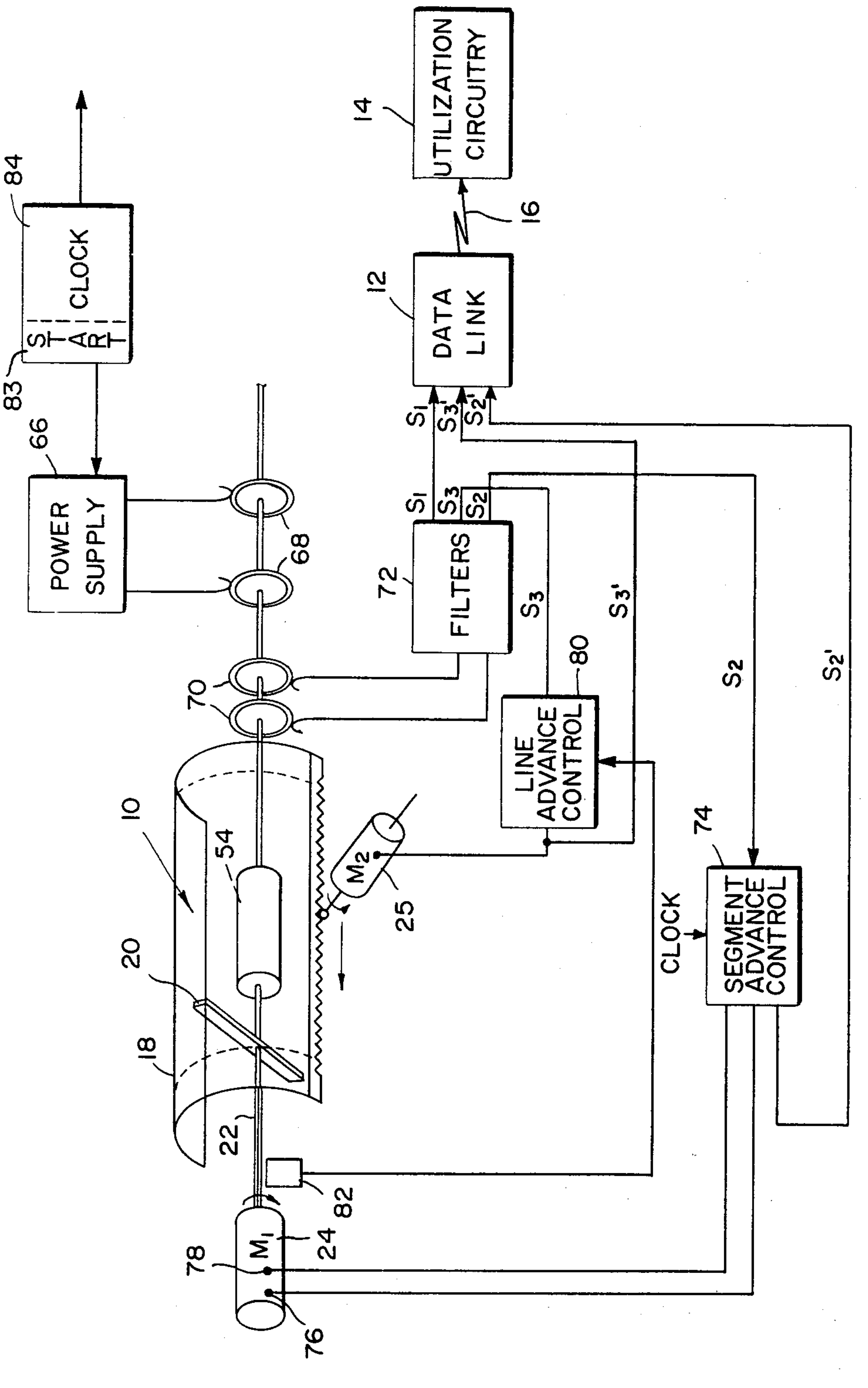
FIG. 1 is a schematic diagram of a facsimile system constructed in accordance with my invention.

FIG. 1 illustrates a system arranged to transmit the contents of a document 10 from a transmitter 12 to a receiver 14 by way of an intervening data link 16. The document, which is mounted on a platen 18, is scanned line-by-line in piecewise fashion by an optical scanner 20 rotated around a shaft 22 by a stepping motor 24. After the scanning of each line by the scanner 20, the document is advanced for scanning of the next line by a motor 25 geared to the platen 18.

The transmitter 12 transmits to the receiver 14 information signals from the scanner 20 representing the data in the document. At the receiver 14, a photosensitive medium is swept by a light source (not shown) in accordance with the movement of the head 20 and the platen 18. The light from the source is modulated in accordance with the information signals and in this fashion reproduces the information from the document 10.

The transmitter 12 also transmits signals for synchonizing movements of the receiver light source with those of the scanner 20. As described below, the rate of such movements depends on the presence or absence of data in the respective portions of the document. Accordingly, the synchronizing signals also contain information relating to the rate at which the light source is to be moved over the photosensitive medium.

Figures 2, 3:
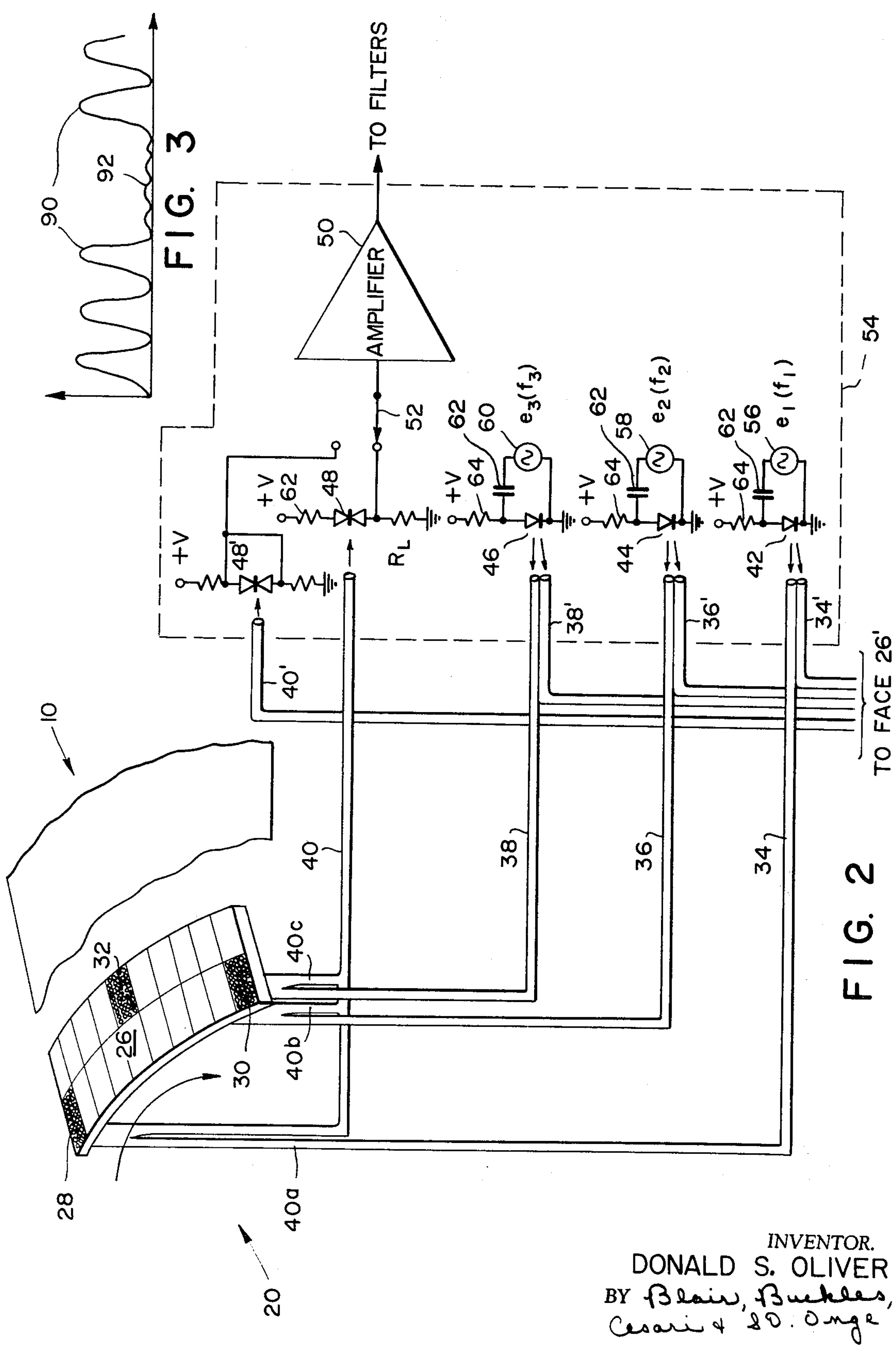
FIG. 2 is a schematic and pictorial diagram of a novel scanner for use in the apparatus of FIG. 1.
FIG. 3 depicts a typical output waveform from one of the scanner heads.

The construction of the scanner 20 is shown in detail in FIG. 2. A face 26 of the scanner has a number of active areas 28, 30 and 32 in which fiber optical bundles 34, 36 and 38 respectively terminate with their ends exposed. A fiber optical bundle 40 has branches 40*a*, 40*b* and 40*c* which also terminate in the active areas 28, 30 and 32 respectively. Light is conveyed from lightaemitting diodes 42, 44 and 46 to the areas 28, 30 and 32 via the fiber bundles 34, 36 and 38. This light is directed onto the document 10 from these areas and the reflected light impinging on these areas is transmitted via the branches **40*a*–40*c* to the bundle 40 and thence to a suitably connected photodiode 48. The output of the diode 48 is applied to an amplifier 50. The light source, the photodiode and the amplifier constitute a detector 54 which is also mounted for rotation about the shaft 22** (FIG. 1).

The area 28 forms a data "reading" head, while the area 30 forms a "segment" data-detecting head and the area 32 forms a "line" data-detecting head. The reading and segment data-detecting heads are located on the same "line" but are separated from each other by the length of one scanning segment, i.e. the arcuate distance the scanner moves in one step of the stepping motor 24. Thus, the segment data-detecting head is located one segment in advance of the reading head in the direction of rotation of the scanner. The line data-detecting head is positioned one line below, or in advance of, the reading and segment data-detecting heads.

The light-emitting diodes 42, 44 and 46 are connected to a.c. signal sources 56, 58 and 60 respectively via capacitors 62 and also to d.c. supply voltages +V applied to them through resistances 64. Each diode generates an output light flux when a voltage of appropriate magnitude is applied to it. The intensity of this flux is modulated by the electrical signal from one of the sources 56–60. Although any of several different diodes are appropriate for the diodes 42–46, I prefer to use gallium arsenide diodes. Since the intensity of the light conveyed to each head via the fiber optical bundles 34–38 is modulated at a different frequency from that of the light supplied to the other heads, each head is effectively "coded" with its own unique code. Thus, the light flux reflected from the document may be identified with the particular heads from which it was emitted regardless of which head actually picks it up; this eliminates the adverse effects of "cross-talk".

Still referring to FIG. 2, if any of the heads is passing under a blank area (characterized by a high light reflectance) on the document, the light reflected back to that head from the document is a maximum. On the other hand, if any head is passing under an ink-bearing area (characterized by a low light reflectance), the light reflected back to that head is a minimum. Thus, the amplitude of the reflected light provides a direct indication of the presence or absence of ink in a given area. In effect, the light fluxes from the various heads are modulated in accordance with the data passing through the field of view of these heads in a given scanning segment. The resulting signals are converted to corresponding electrical signals by the photodiode 48 and are supplied as a combined output signal from the detector 54.

So far only one face 26 of the scanner 20 has been described. A second, diametrically opposed face 26' of the scanner 20 is identical with the face 26 and operates in the same fashion. Thus, fiber branches 34', 36' and 38' carry light to the face 26' from the sources 42–46 while fiber branch 40' carries light reflected from the document to the photodiode 48'. The resultant signal is fed to the amplifier 50 via a switch 52. This switch is operated to connect the amplifier 50 alternately to the photodiode 48 and the photodiode 48' once during each 360° of rotation of the scanner 20 since each scanner face sweeps over the document 10 once during each complete revolution of the scanner.

Referring back to FIG. 1, the detector 54 is supplied with d.c. power from a power supply 66 via slip rings 68. The combined output signal from the detector 54 is applied via slip rings 70 to filters 72 tuned respectively to the frequencies $f_1$, $f_2$ and $f_3$ which characterize the light fluxes applied to the optical heads of the scanner. The outputs of the filters are electrical signals $s_1$, $s_2$ and $s_3$ which correspond to the light signals obtained from the reading head 28, the segment detecting head 30, and the line data-detecting head 32 respectively.

The signal $s_1$ is applied directly to the transmitter 12 which transmits it via the data link 16 to the remote receiver 14.

The signal $s_2$ is applied to a segment advance control unit 74 which supplies signals to one of two terminals 76 and 78 of the motor 24 in accordance with the state of the signal $s_2$. The motor 24 is a two-speed d.c. stepping motor which rotates the scanner 20 through a segment of fixed length at one of two rates depending on whether it is energized at the terminal 76 or at the terminal 78. An output signal $s'_2$ from the segment advance control unit 72 is also applied to the transmitter 12 for transmission via the data link 16 to the remote receiver 14.

The signal $s_3$ is applied to a line advance control unit 80 to control the motor 25 which advances the platen 18 with respect to the scanner 20. The line advance control unit 80 also receives a gating signal from an end-of-line detector 82 after the scanner 20 has scanned through an arc equivalent to the length of a line on the document. When the appropriate signal has been received from the detector 82, the unit 80 causes the motor 25 to advance the platen 18 one or more lines in accordance with the state of the input signal $s_3$. In addition to driving the motor 25, the unit 80 also generates an output signal $s'_3$ which is also applied to the transmitter 12 for transmission to the remote receiver 14.

The system is activated by manually depressing a start button 83 which connects the power supply 66 to the slip rings 68 and which starts an internal clock 84.

FIG. 3 is a sketch of a typical output waveform from the scanner 20. The shape and frequency of the output signal from any of the heads is that of the appropriate source $e_1$, $e_2$, or $e_3$. For purposes of illustration, the signal is shown as a sine wave. The amplitude of the sine wave is relatively large when blank areas (areas of high light reflectance), are being scanned, as indicated at 90, and relatively small when ink-bearing areas (areas of low light reflectance) are being scanned as indicated at 92.

In order to transmit the signal illustrated in FIG. 3 over a typical telephone line with the desired quality of reproduction, the bandwidth of the signal must be no greater than that of the line, e.g. approximately 3,000 Hz. If a resolution of 0.01 inches is desired, this frequency limitation means that a maximum reading head velocity $v_{max}= (f_{max})$ (desired resolution) = (3,000) (0.01) = 30 inches/second be employed for reading data-bearing segments of a document. In practice, a reading speed of 20 inches/ second is employed to ensure operation well within the capabilities of the system.

When scanning segments of the document 10 containing no data, the scanning velocity may be greatly increased since there is no information from the reading head to be transmitted to the receiving end of the system. Accordingly, when a "blank" segment of a predetermined minimum length is encountered by the segment data-detecting head, a control signal is generated in the control unit 74 to cause the speed at which the reading head moves over that segment to increase by a factor of 10 to a rate of 200 inches per second. The scanner continues moving at this rate until a data-bearing segment is encountered by the head. The speed is thereupon reduced so that the reading head will scan the new segment at the lower speed required for reading and transmittal of information over the data link 16.

As indicated previously, the resolution of any of the heads is proportional to the scanning speed and to the frequency of the signal applied to the particular head. In order to maintain the same resolution for the segment data-detecting head when the scanner is operating at high speed as is obtained in the reading head when the scanner is operating at low speed, the frequency $f_2$ of the signal supplied to this head is higher than that of the signal $s_1$ by the ratio of the high scanning rate speed to the normal scanning rate. Thus, if the normal scanning velocity is $v$ and the high speed scanning velocity is $n \cdot v$, where $n$ is an integer, the frequency $f_2$ of the segment advance head input signal should be at least $n \cdot f$ to maintain the desired resolution. For similar reasons, the frequency $f_3$ should be at least equal to $f_2$ and preferably greater to facilitate separation of the signals $s_2$ and $s_3$. Since the latter two signals are not transmitted directly but are modified prior to transmission, the frequency limitations of the transmission line do not apply to them.

The control circuitry for generating the appropriate control signals and for applying them to the transmitter 12 along with the appropriate signals indicating the presence or absence of data in a particular scanning segment will now be described in detail.

Figure 4:
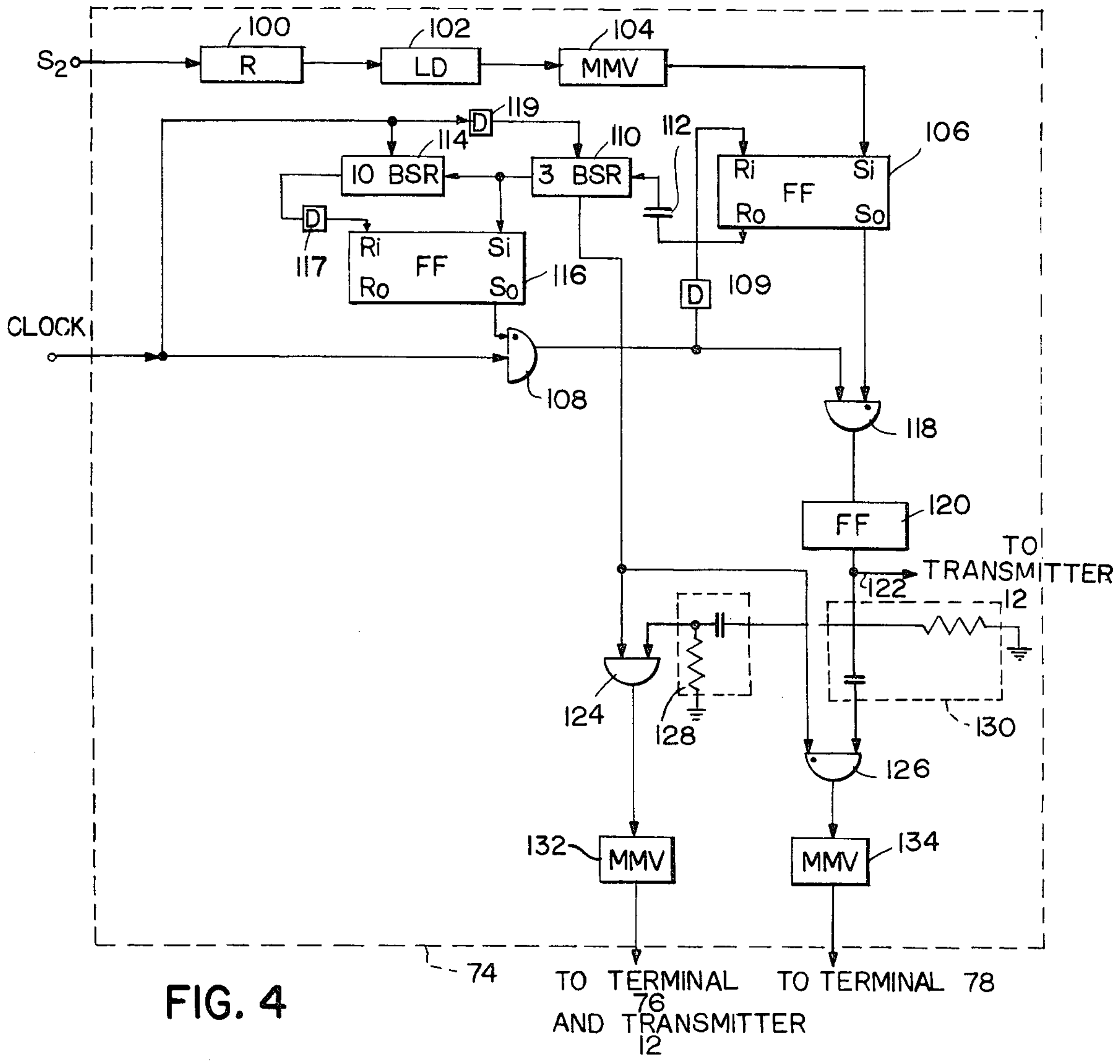
FIG. 4 is a schematic diagram of a control circuit for the segment data-detecting head.

The segment advance control unit 74 is illustrated in detail in FIG. 4. As may be seen from this figure, the signal $s_2$ from the segment advance data-detecting head 30 is applied to a rectifier 100. A level detector 102 generates an output whenever the amplitude of the rectified signal is below a predetermined level. This indicates the presence of a black portion in the segment being scanned by the head 30, that is, that data is present in the segment. The output of the level detector 102 triggers a monostable multivibrator 104 which in turn "sets" a flip-flop 106. The flip-flop 106 is reset by clock pulses from a gate 108 after passing through a delay unit 109.

Each time the flip-flop 106 is reset, a capacitor 112 passes a pulse representing a digital "one" into the input end of a three-bit shift register 110. The output end of the register 110 is connected to the input end of a ten-bit shift register 114 and also to the "set" input terminal of a flip-flop 116. The output end of the shift register 114 is connected to the "reset" input terminal of the flip-flop 116 via a delay unit 117. Clock pulses from the clock 84 (FIG. 1) shift the register 114; they also shift the register 110 after passing through a delay unit 119.

A gate 108 has an "inhibit" input terminal connected to the flip-flop 116 so that clock pulses which would normally pass through the gate 108 are inhibited from doing so as long as the flip-flop 116 is in its "set" state. The output of the gate 108 is applied to a gate 118 which is inhibited by the "set" state of the flip-flop 106. The output of the gate 118 is applied to the "complement" input terminal of a flip-flop 120 which changes from one state to the other whenever it receives a signal from the gate 118.

The flip-flop 120 supplies a control signal over a lead 122 to the transmitter 12 and also supplies this signal to gates 124 and 126 via a pair of differentiating networks 128 and 130 respectively. The gate 124 receives an enabling input from the second stage of the shift register 110; the output of the gate 124 triggers a monostable multivibrator 132 to generate an output pulse of predetermined duration. The output of the multivibrator 132 is applied directly to terminal 76 of the motor 24 (FIG. 1) to drive this motor at a slow scanning rate. Similarly, the gate 126 triggers a monostable multivibrator 134 to generate an output pulse of predetermined duration for the high speed terminal 78 of the motor 24 (FIG. 1).

Figure 5:
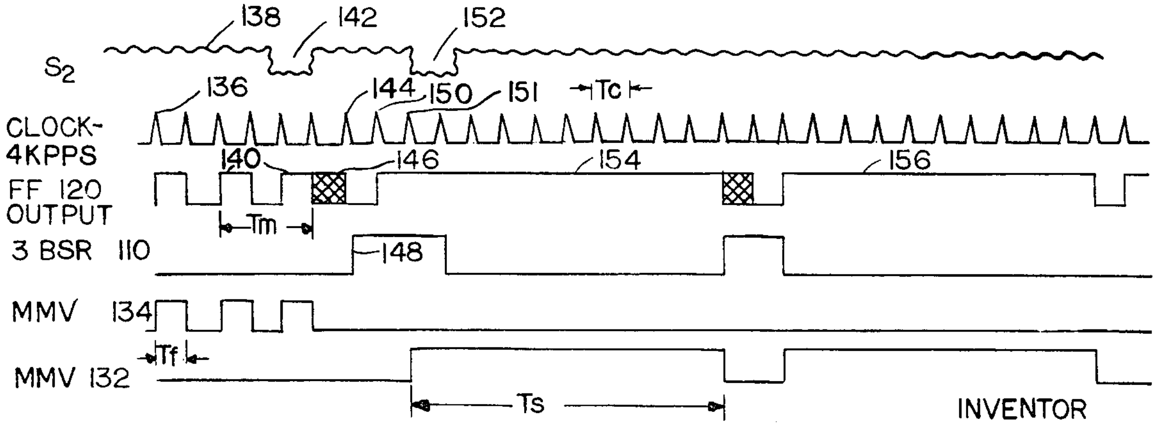
FIG. 5 is a graph of representative waveforms at selected points in the circuit of FIG. 4.

The operation of the segment advance control unit 74 will be understood more readily by referring also to FIG. 5 which is a plot of selected waveforms appearing at various portions of the control unit 74. It is assumed that all registers and storage devices in the circuit have been properly cleared. Clock pulses from the clock 84 (FIG. 1) are supplied to the unit 74 at a rate of 4,000 pulses per second; they are illustrated at 136 in FIG. 5. The period $T_c$ of these pulses is 1/4000 sec. The output $s_2$ of the segment advance data-detecting head 30 (FIG. 2) is also shown in FIG. 5. As long as this head does not detect a black portion in a given scanning segment, its output is in the "up state" as illustrated at 138 in FIG. 5. The flip-flop 106 then remains in the reset state, and the gates 108 and 118 remain open so that successive clock pulses are fed through these gates to the flip-flop 120 to cause this flip-flop to change its state in a regular and symmetrical manner as indicated by the output pulses 140. These pulses occur at a rate equal to one-half the clock rate, i.e. at a rate of 2,000 pulses per second; they indicate that the motor 24 (FIG. 1) is to step at the fast rate during each succeeding pulse interval $T_m$. These pulses are applied to the terminal 78 of the motor 24 (FIG. 1) to step this motor at the fast rate.

If, now, the data detecting head 30 detects a black portion during a given scan, the level of the output signal from this head drops as indicated at 142 in FIG. 5. This change in level is detected by the level detector 102 to trigger the multivibrator 104 and thereby set the flip-flop 106; this inhibits the gate 118. The next clock pulse (144 in FIG. 5) applied to the control unit 74 then passes through the gate 108, but not through the gate 118. The flip-flop 120 therefore remains in its previous or "up" state and its output pulse 146 is lengthened as compared to the previous output pulses 140. This lengthened pulse indicates that the segment advance data-detecting head 30 has sensed a black portion during a segment scan and that the next segment scan is therefore to be performed at a slow rate so that the black portion can be "read" by the reading head 28. The increased length of this pulse is indicated by the shaded portion of the pulse. After a brief delay, the clock pulse 144 also resets the flip-flop 106 and the capacitor 112 applies an input pulse to the shift register 110. The first stage of this register thus has a digital "one" stored in it as shown at 148 in FIG. 5.

The next clock pulse 150 applied to the control unit 74 passes through the gates 108 and 118 to the flip-flop 120 to return this flip-flop to its "zero" or "down" state, thus completing formation of the pulse 146 (FIG. 5). The same pulse shifts the digital "one" in the first stage of the register 110 to the second stage thereof. This enables the gate 124 and blocks the gate 126 so that the multivibrator 134 no longer receives triggering signals from the flip-flop 120. The following clock pulse 151 passes through the gates 108 and 118 to set the flip-flop 120 once again to its up or "one" state. The rise in the output of the flip-flop 120 is differentiated by the network 128 and passed through the gate 124 to the multivibrator 132 to generate a "slow" driving pulse for the motor 24 (FIG. 1).

The clock pulse 151 also shifts the digital "one" in the register 110 to its third or output stage to load a digital "one" into the first stage of the shift register 114 and to "set" the flip-flop 116 so as to inhibit further clock pulses which would ordinarily pass through the gate 108. As long as the gate 108 is blocked, therefore, the flip-flop 120 remains at its "up" or "one" level. The digital "one" in the register 114 is shifted through the register one stage at a time by each succeeding clock pulse until it appears at the output of this register and resets the flip-flop 116 after a slight delay to ensure that the gate 108 is enabled only after the current clock pulse is completed.

If the data detecting head 30 has not seen a black portion during the "slow" scanning interval (that is, during the time required to scan a scanning segment at the slow rate) the flip-flop 106 remains reset throughout the interval and the gate 118 immediately begins to pass pulses as soon as they are received through the gate 108 from the clock source. The output pulses from the flip-flop 120 then again assume the form shown at 140. If, on the other hand, a signal such as the signal 152 (FIG. 5) is received from the data detecting head 30 during the slow scanning interval, the flip-flop 106 is set and remains in this state as long as the gate 108 is blocked. When the gate 108 is again opened at the termination of the slow scanning interval, therefore, the first clock pulse passing through the gate 108 is inhibited from passing through the gate 118 and the down state of the flip-flop 120 is prolonged for a time interval equal to that of an additional clock pulse; thus, the pulse 154 will be 11 units long instead of 10 units long. The maintenance of the pulse at the "up" or "one" level for an additional time period (denoted in FIG. 5 by the shaded portion 155) again denotes that a black portion has been detected during the current scan and therefore that the next scan is to be performed at a slow rate. Accordingly, the control unit 74 runs through the same sequence of operations as it did on generating the pulse 146.

Assuming that no signal is received from the data detecting head 30 during the second slow scan, the pulse 156 is only 10 clock pulse units long and the fast pulse pattern noted at 140 is again generated by the flip-flop 120 for subsequent scans. Thus, the output signal from the flip-flop 120 provides an indication of the speed at which each subsequent scan is to be performed. This signal is therefore sent to the transmitter 12 for transmission to the remote receiver. The output of the network 130 is also applied to the transmitter for reasons which will be described below.

Figure 6:
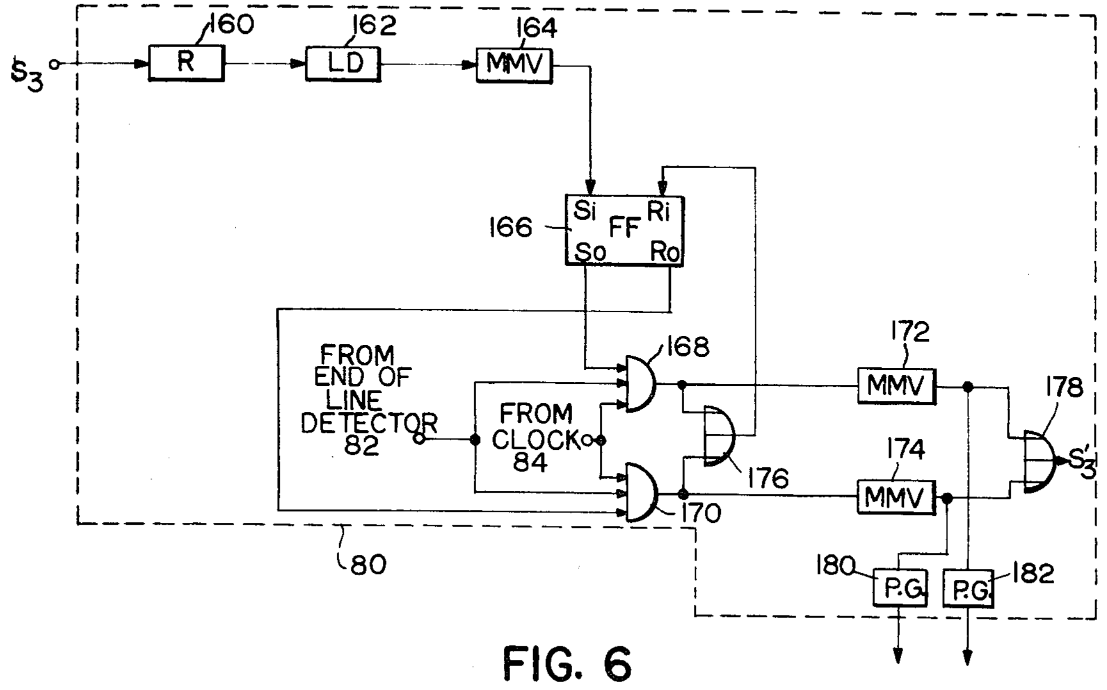
FIG. 6 is a schematic diagram of a control circuit for the line data-detecting head.

After the scanning of each line, the scanner must be indexed to the next line. This indexing is performed under control of the line advance control unit 80 which is illustrated in detail in FIG. 6.

As was the case with the output $x_2$ from the segment advance data-detecting head, the output $s_3$ from the line advance data-detecting head is applied to a rectifier 160 and thence to a level detector 162 which generates an output whenever the amplitude of the rectified signal is below a predetermined level. This indicates the presence of a black portion in the line being scanned. The output of the level detector 162 triggers a monostable multivibrator 164 which "sets" a flip-flop 166. Gates 168 and 170 are connected to the "set" and "reset" output terminals of the flip-flop 166 respectively. These gates also receive input signals from the end-of-line detector 82 and from the differentiator 130 (FIG. 4) respectively.

When the flip-flop 166 is set due to the detection of a black portion in a scanning segment by the line advance data-detecting head 32, the gate 168 is conditioned for passing signals and does so whenever a positive-going transition of the flip-flop 120 (FIG. 4) coincides with a signal from the end-of-line detector 82. When this occurs, a monostable multivibrator 172 is triggered to generate an output pulse of predetermined time duration, for example, three clock pulse periods. In contrast, if a black portion has not been detected during the scanning of a given line, the flip-flop 166 remains in the "reset" state, the gate 168 remains closed, but the gate 170 is enabled and it conducts when a positive-going transistion of the flip-flop 120 and an end-of-line signal coincide in time. When this occurs, a monostable multivibrator 174 is triggered to generate an output pulse of a different time duration than the multivibrator 172, for example, 4 clock pulse periods in length. These two outputs are then connected to the transmitter 12 via a gate 178 for transmission to the remote receiver. They are also connected, respectively, to pulse generators 180 and 182 which generate one or two pulses respectively for the line advance motor 25 to advance this motor one or two lines as the case may be. The flip-flop 166 is also reset via an OR gate 176 whenever the gates 168 or 170 conduct.

Figures 7, 8:
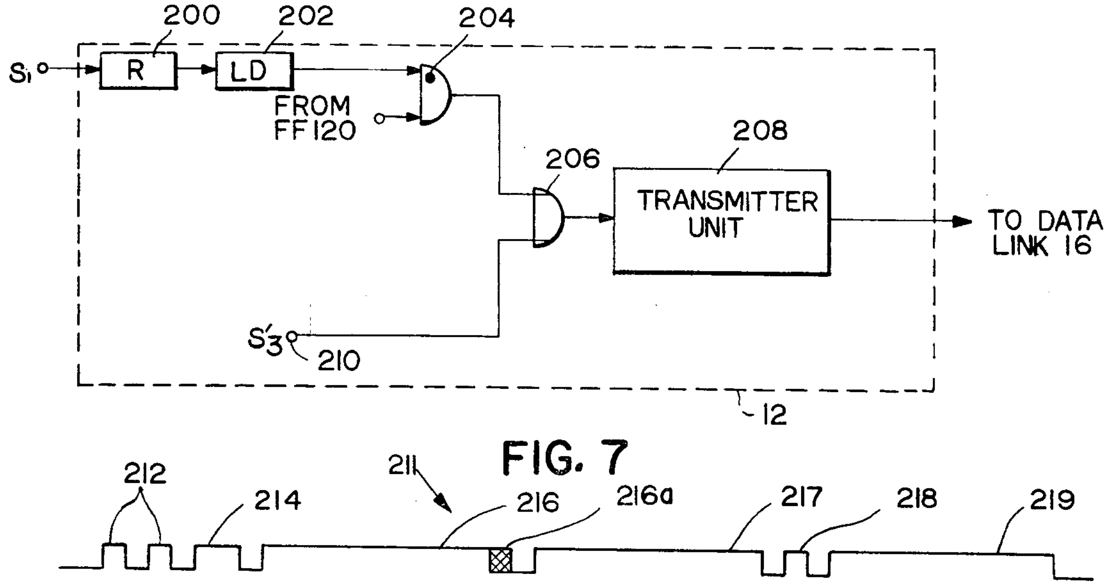
FIG. 7 is a schematic diagram of the data link of FIG. 1 in more detail.
FIG. 8 is a plot of a typical waveform sent by the transmitter to the remote receiver.

FIG. 7 is a schematic diagram of the transmitter 12 which receives the signals from the reading head 28, the flip-flop 120, and the line advance data-detecting head 32 for transmission over the data link 16 to the remote receiver 14. The output $s_1$ of the reading head 28 is applied to a rectifier 200 and thence to a level detector 202 which generates an output whenever this signal falls below a predetermined level to thereby indicate that a black portion is passing under the reading head. The output of the level detector inhibits a gate 204 to disconnect flip-flop 120 from data link 16 and thereby drop the transmitted voltage whenever an ink-bearing portion is read. Since the reading head 28 supplies an output only during a "slow" scan, only the "slow" control pulses (e.g. pulses 154 and 156 in FIG. 5) from the flip-flop 120 are affected by the "-data" signals from the head 28; the remaining control pulses are not affected. Thus, the "slow" pulses from the flip-flop 120 are modulated by the output of the reading head. The output of the gate 204 is applied through an OR gate 206 to a transmitter unit 208. The transmitter unit 208 connects the signals to the data link 16 for transmission to the remote receiver 14. The line advance signal $s'_3$ indicating whether the receiver unit is to index one line or two at the end of a line is also supplied to the transmitter unit 208 from an input terminal 210 via the gate 206. Since this signal occurs only at the end of a line when no black portions are being scanned, it is added directly to the composite signal applied to the transmitter unit 208. The resultant signal thus contains all the information necessary to reproduce the contents of the document.10.

FIG. 8 shows a signal illustrative of those sent over the data link 16; it contains all the essential information for controlling the reproducing end of the system. The digital "value" that the signal has at each pulse interval is shown directly below the respective pulse interval. The pulses 212 each of length $T_r$ signal that a fast scan is to occur in the next pulse period; when received by the receiver 14, they cause the segment advance stepping motor in that unit to step at a fast rate. The pulse 214 is twice as long as either of the pulses 212 and indicates that a slow scan is to start at the next scanning period. Accordingly, this pulse is utilized in the local receiver to set up the circuitry for a slow scan. The pulse 216, shown in solid line, corresponds to the performance of a slow scan. The dotted line portions within the slow scan correspond with data from the reading head 28 and accordingly modify the shape of the pulse 216 as described above. For purposes of illustration, this pulse is shown as being 11 time units long, the digital "one" in the last or rightmost position 216*a* of the pulse indicating that a black portion has been detected by the segment advance data-detecting head during the current scan and that accordingly the next scan is also to be a slow scan. At the end of the slow scan, the pulse 216 descends to the "zero" level for one "fast" pulse time interval $T_f$ and then returns to the "one" or "up" level for an additional 10 "fast" pulse time intervals $T_f$ as indicated at 217 to signal that a second slow scan is being performed. At the end of the second slow scan, no black portion has been detected by the segment advance data-detecting head during the scan; the scanner then returns to the "fast" stepping mode and "fast" pulses 218 are again generated and transmitted to the receiver 14. At the end of a line, an "end-of-line" signal 219 occurs; this signal is three or four "fast" time pulse intervals long depending on whether the scanning head is to index one or two lines in preparation for the next scan. Illustratively in FIG. 8, the pulse 219 is four units long to indicate the line advance motor in the remote receiver is to advance two lines.

Figure 9:
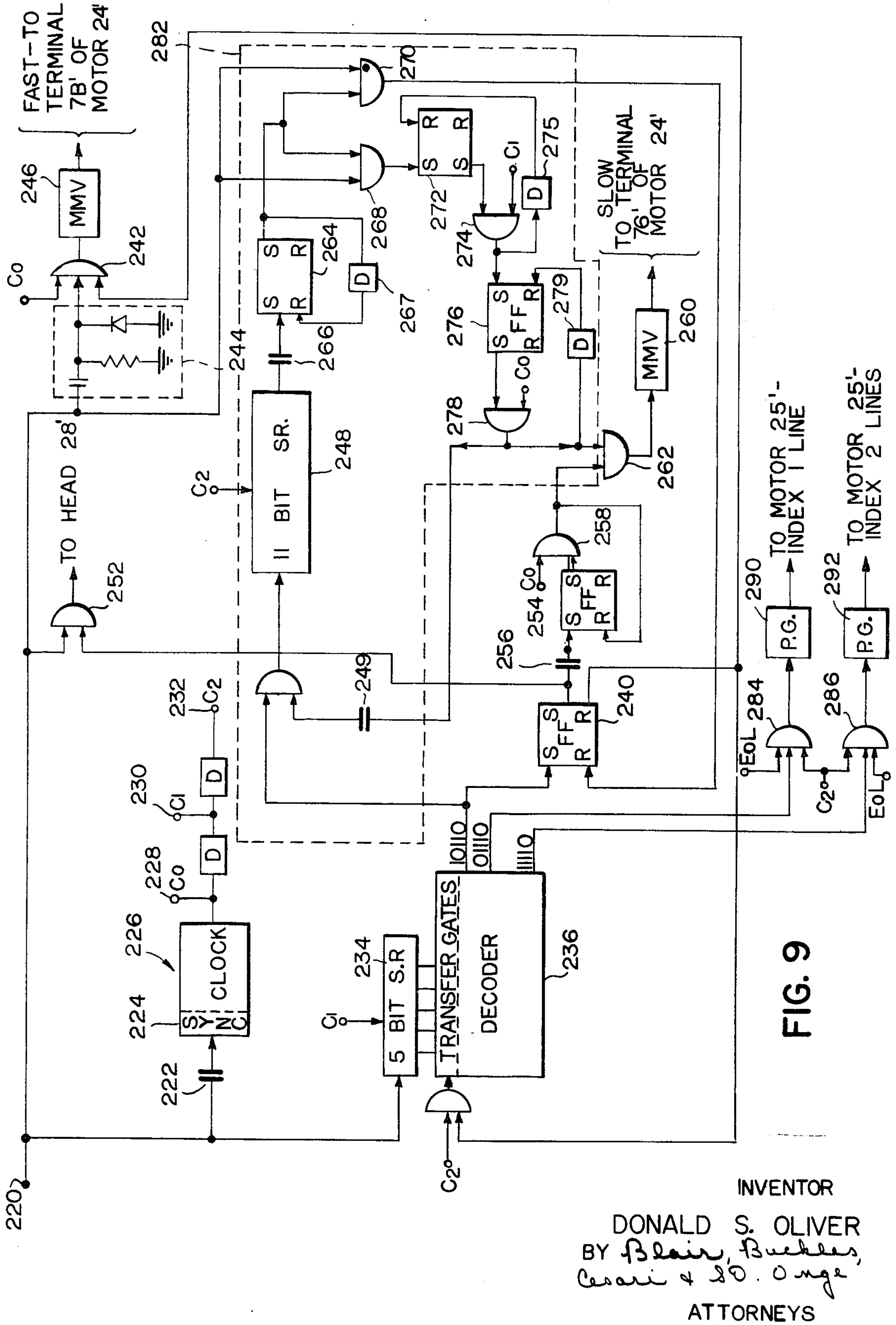
FIG. 9 is a schematic diagram of a representative signal-receiving and decoding circuit contained in the remote receiver.

FIG. 9 is a schematic diagram of the control portion of the remote receiver 14 which receives the signal shown in FIG. 8 and decodes it to control the remote reproduction of the document 10. The input from the data link 16 is applied to a terminal 220 for further processing. A capacitor 222 transmits pulses from the terminal 220 to a synchronizer 224 in a free-running clock 226 which generates clock pulses at the same rate as the clock 84 (FIG. 1) and in synchronism with the signals applied to the terminal 220. The synchronizer 224 "locks" the clock 226 into synchronism with the leading edge of the pulses in the waveform shown in FIG. 8 and thus the clock is maintained in synchronism with the clock in the transmitter portion of the system. The clock pulses are supplied as direct outputs at a time $t_o$ without any delay on a terminal 228 (clock pulses from this terminal are denoted $c_0$, the subscript zero indicating zero delay) and are also supplied as outputs $c_1$ and $c_2$ of delay units 230 and 232 at slightly later times. The delay time $t_d$ of each unit 230 and 232 is slightly greater than the pulse width of a clock pulse from the clock 226, but substantially less than the pulse repetition period of these pulses. The reason for this will be made more clear below.

The signal applied to the terminal 220 is also applied to a five-bit shift register 234 which is shifted in response to clock pulses $c_1$. The contents of the shift register 234 are tested by a decoder 236 by means of clock pulses $c_2$ applied to a gate 238. The gate 238 is enabled when a flip-flop 240 is in the "reset" state. During the "reset" condition, the flip-flop 240 also enables a gate 242 which passes signals applied to it from the terminal 220 through a differentiating network 244 to trigger a monostable multivibrator 246 whenever a clock pulse $c_0$ is present. The gate 242, differentiator 244 and multivibrator 246 provide a control signal to the terminal 78' of the reproduction driving motor 24' whenever a fast pulse command appears in the control signal such as the pulses 212 and the initial portion of the pulse 214 in FIG. 8.

As long as fast-pulse control signals are being received, the flip-flop 240 is in the "reset" state. When, however, the code 10110 is detected by the decoder 236, thereby indicating that the next clock pulse period starts a slow scan, the decoder 236 sets the flip-flop 240 and also loads a digital "one" into an eleven-bit shift register 248 via a capacitor 249 and an OR gate 250. As the flip-flop 240 changes to its "set state", it "-sets" a flip-flop 254 via a capacitor 256 to thereby enable a gate 258 to pass clock pulses $c_0$ at the next time they are generated. The next clock pulse resets the flip-flop 254 and triggers a monostable multivibrator 260 via an OR gate 262. The output of the multivibrator 260 is applied to the terminal 76' of the scanning motor 24' in the remote receiver (not shown). The pulse from the multivibrator 260 then drives the motor 24' in its "slow" scanning mode.

While the motor 24' is generating a slow scanning pulse, the "one" bit which was loaded into the shift register 248 is being shifted through the successive stages of this register on receipt of clock pulses $c_2$. Immediately after the multivibrator 260 terminates the slow pulse, the register 248 shifts the "one" bit into the eleventh stage of the register, thereby setting a flip-flop 264 via a capacitor 266. Setting the flip-flop 264 enables a gate 268 and inhibits a gate 270. These gates are also supplied with input signals from the terminal 220. The gate 268 tests the condition of the waveform applied to the terminal 220 in the "11th bit" position 216*a* (FIG. 8). If the waveform is at the "zero" level at this time, the next scan is to be performed at a fast rate; accordingly, the gate 270 is opened to reset the flip-flop 240 and condition the gate 242 to trigger the multivibrator 246 for a fast scan.

If, however, the input to the terminal 220 is in the "one" state at position 216*a*, the next scan is to be performed at a slow rate. Accordingly, the gate 268 is enabled from the terminal 220 to set a flip-flop 272. The flip-flop 272 in turn enables a gate 274 which resets the flip-flop 272 after a suitable delay provided by a delay unit 275 whose purpose is to insure that the clock pulse $c_1$ is passed fully through the gate 274; it also "sets" a flip-flop 276. The flip-flop 272 and gate 274 effectively form a one-bit delay unit to insure a transition period of one clock pulse interval between scans. Setting the flip-flop 276 enables a gate 278 to pass a clock pulse at the next clock pulse time $c_0$. The output of the gate 278 also resets the flip-flop 276 through a delay unit 279 which insures that the clock pulse $c_0$ passes completely through the gate 278 before the flip-flop 278 is reset. It also triggers the multivibrator 260 to start another slow scan and loads a "one" bit into the register 248 to start the timing process over again. Effectively, the various flip-flops, gates and shift registers shown enclosed within the dotted line in FIG. 9 constitute an "11th bit" tester to determine whether an additional slow scan is to occur after a current slow scan or whether the input drive to the reproducing motor can again be shifted to the "fast" stepping mode.

When the indicated slow scans have been performed and the reproducing system returns to the "fast" stepping mode, the flip-flop 240 is once again reset, the gate 238 is enabled, and the decoder 236 again checks the contents of the register 234 for a recognizable code. On encountering either of the codes 01110 or 11110, the decoder 236 enables gates 284 or 286 respectively to indicate that the scanner at the transmitting end of the system has come to the end of a line on the document 10 and that the scanner in the remote receiver must accordingly be indexed by one or two lines with respect to the document being reproduced, the amount by which it is indexed depending on which of the two codes is received by the decoder 236. The end-of-line detector 82' (not shown) in the remote receiver also generates an output when the scanner in the remote receiver has reached the end of a line and this output will also be applied to the gates 284 and 286. Accordingly, when a clock pulse $c_2$ is received at these gates, one or the other of a pair of pulse generators 290 or 292 are triggered, depending on the output of the decoder 236. The pulse generator 290 generates a single output pulse which advances the motor 25' in the remote receiver a single line while the pulse generator 292 generates a pair of output pulses to cause the motor 25' to advance the scanner by two lines with respect to the document. Thus, the circuit of FIG. 9 decodes the signal transmitted to the remote receiver to separate the data from the control signal and to generate the appropriate segment advance and line advance commands for the local driving motors at the appropriate times.

From the above it will be seen that I have provided a novel facsimile system for reading a document at one of two different rates, dependent on the presence or absence of ink-bearing portions in the portions being read. The system has a novel optical scanner which, in addition to the usual reading head, has segment and line data-detecting heads for determing the presence or absence of black portions in advance of the reading head in a given line and in the next line respectively. These heads control the speed at which the reading head moves over these portions or lines.

In addition to the scanner, I have also provided circuitry for encoding the output of the various heads at the "reading" end of the system for simultaneous transmission over a data link of limited bandwidth and circuitry for decoding the signal transmitted to the remote receiver to cause the reproduction facilities in the receiver to accurately reproduce the contents of the document being read at the reading end. In reproducing a document having a significant amount of blank space, this system provides a significant effective bandwidth compression.

Additional features such as the utilization of discrete-frequency signals to "drive" each of the heads and the use of fiber optics in the assembly of the scanner further contribute to the advantageous results of the invention.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim the following:

1. Apparatus for the reproduction at a remote location of the contents of a document containing indicia therein, said apparatus comprising in combination A. an optical scanner for scanning discrete segments of the document in line-by-line and stepwise fashion and having
   1. an optical reading head for generating data signals in accordance with the indicia in said segments as said scanner scans each segment in sequence,
   2. a first optical indicia-detecting head
      a. positioned in advance of said reading head,
      b. for generating first control signals indicative of the presence or absence of indicia in a segment in advance of the reading head,
   3. a second optical indicia-detecting head
      a. positioned in advance of said reading head,
      b. for generating second control signals indicative of the presence or absence of indicia in a line in advance of the line read by the reading head at a given time, B. first driving means for advancing said reading head over said document in stepwise fashion and at a controlled rate in accordance with said first control signals, C. second driving means for advancing said reading head one or more lines with respect to said document in accordance with said second control signals, D. a light source for each head, each source providing light to its associated head for illuminating a selected portion of the document, E. a detector connected to said scanner for receiving light reflected from said document onto said heads and for generating electrical signals comprising a data signal and a plurality of control signals in accordance therewith, F. a remote receiver having driving means and image-reproducing means operated in synchronism with said scanner to thereby reproduce the contents of said document at a remote location, and G. a transmission link for transmitting to said receiver a plurality of signals derived from said data signals and said first and second control signals respectively whereby said receiver may reproduce the contents of said document.

2. Apparatus according to claim 1 in which the first and second driving means include first and second d.c. stepping motors respectively, the first stepping motor advancing the scanner one segment per step at a rate dependent on the first control signal and the second stepping motor advancing the scanner one line per step at a rate dependent on the second control signal.

3. Apparatus according to claim 1 in which the light sources each comprise a light-emitting diode having a d.c. voltage source connected to provide a bias current therethrough and having an a.c. voltage source connected thereto to vary the bias current at a predetermined rate to thereby provide an output light signal whose amplitude is modulated in accordance with the a.c. signal.

4. Apparatus according to claim 1 in which the first indicia-detecting head and the reading head are spaced apart in the scanner a distance equal to the length of a scanning segment whereby the first indicia-detecting head scans one segment in advance of the reading head.

5. Apparatus according to claim 4 in which the second indicia-detecting head is spaced from the reading head a distance sufficient to permit the second head to scan the document one line in advance of the reading head.

6. Apparatus according to claim 5 in which the reading head and the indicia-detecting heads are formed from a plurality of optical fibers interconnecting the scanner with the light sources and the detector, the heads being formed as the termination of exposed ends of groups of said fibers in a surface of the scanner adjacent the document.

7. Apparatus according to claim 1 in which the remote receiver includes

A. a shift register for receiving signals transmitted to said receiver from said transmitter, B. a decoder connected to said shift register to supply one of a plurality of outputs dependent on the contents of said shift register, C. means responsive to the decoder output for driving said remote receiver driving means at a first rate when the contents of said shift register correspond to a first pattern, D. means responsive to the decoder output for driving the remote receiver driving means at a second rate when the contents of the shift register correspond to a second pattern, and E. means responsive to the decoder output for advancing the image-reproducing means by one or two lines when the contents of said register correspond to third or fourth patterns respectively.

8. Apparatus according to claim 7 which includes gating means for applying to said image-reproducing means those signals transmitted to said receiver which correspond to said data signals, said gating means being operative only when the remote receiver driving means is operating at said second rate.

9. Apparatus according to claim 8 which includes a shift register and control means associated with said shift register for repeating the operation of said driving means at said second rate when a predetermined control signal is detected by said control means.

10. In a facsimile transmitter:

reading means for scanning indicia in a given area of a line on a data bearing medium and for generating data signals in accordance with said indicia;

first indicia detecting means for detecting the presence of indicia in the next area of said line to be scanned by said reading means and for generating control signals indicative of the presence or absence of indicia in said next area of said line in advance of said reading means, said reading means and said first indicia detecting means including separate light sources whose intensities are periodically varied at separate and distinct rates for distinguishing the light associated with said reading means from that associated with said first indicia detecting means; and control means coupled to said first indicia detecting means for causing said reading means to scan indicia containing areas of said line at a given velocity and for causing said reading means to scan non-indicia containing areas of said line at a higher velocity than said given velocity.

11. Apparatus according to claim 10 in which said control means causes said reading means and said first indicia detecting means to simultaneously scan said medium.

12. Apparatus according to claim 11 in which said control means includes a stepping motor operable in response to said control signals for driving said reading means and said first indicia detecting means at said given or higher velocity in accordance with the presence or absence of indicia, respectively, in areas of said medium scanned by said reading means.

13. Apparatus according to claim 10 in which said reading means and said first indicia detecting means each include a light-transmitting portion for directing light from its associated source onto said medium and a light-receiving portion for receiving light reflected from said medium.

14. Apparatus according to claim 13 in which said light-receiving and light-transmitting portions comprise fiber optical bundles.

15. Apparatus according to claim 10 and further including a second indicia detecting means spaced from said reading means and from said first indicia detecting means for generating output signals indicative of the presence or absence of indicia in the next line of said medium in advance of said reading means and said first indicia and detecting means, and including means actuated by said output signals for causing said reading means to advance beyond said next line without the scanning thereof when no indicia are detected by said second indicia detecting means in said next line.

16. Apparatus according to claim 15 in which said second indicia detecting means is caused to scan said medium simultaneously with said reading means and said first indicia detecting means.

17. Apparatus according to claim 10 and further including means for combining the data signals from said reading means and said control signals into a single composite signal for transmission over a data link.

18. Apparatus according to claim 17 in which said data signals are encoded into portions of the control signals indicative of the presence of indicia and corresponding to said given velocity.

19. Apparatus according to claim 18 in which said control means includes a level detector for detecting the amplitude of the signals from said first indicia detecting means, means for generating first signals corresponding to said higher velocity, means for generating second signals corresponding to said given velocity, and means for applying said second signals in place of said first signals when the amplitude of the signals applied to said level detector passes beyond a threshold value indicating that indicia are being detected by said first indicia detecting means.

20. Apparatus according to claim 19 in which said means for generating said first signals includes a clock pulse generator, a flip-flop, and gating means connecting said clock pulse generator to said flip-flop when the amplitude of the signals applied to said level detector does not pass beyond said threshold value, said flip-flop alternating from one state to another under control of said clock pulse generator for generating said first signals.

21. Apparatus according to claim 20 in which said means for generating said second signals includes means responsive to said level detector for blocking said gating means for a predetermined time when indicia are detected by said first indicia detecting means.

* * * * *